US011920745B1

(12) United States Patent
Sholtis-Furyes et al.

(10) Patent No.: US 11,920,745 B1
(45) Date of Patent: Mar. 5, 2024

(54) LIGHTING SYSTEMS COMPRISING CONNECTABLE LIGHTING DEVICES

(71) Applicant: Energizer Brands, LLC, St. Louis, MO (US)

(72) Inventors: Ruth Sholtis-Furyes, Lakewood, OH (US); Joanna Lynn Celestina, Willoughby, OH (US)

(73) Assignee: Energizer Brands, LLC, St. Louis, MO (US)

( * ) Notice: Subject to any disclaimer, the term of this patent is extended or adjusted under 35 U.S.C. 154(b) by 0 days.

(21) Appl. No.: 18/062,935

(22) Filed: Dec. 7, 2022

(51) Int. Cl.

| | |
|---|---|
| ***F21L 4/00*** | (2006.01) |
| ***F21L 2/00*** | (2006.01) |
| ***F21V 21/096*** | (2006.01) |
| ***F21V 21/40*** | (2006.01) |
| ***F21V 23/00*** | (2015.01) |

(52) U.S. Cl.
CPC ................. *F21L 4/005* (2013.01); *F21L 2/00* (2013.01); *F21V 21/0965* (2013.01); *F21V 21/406* (2013.01); *F21V 23/003* (2013.01)

(58) Field of Classification Search
CPC ......... F21L 4/005; F21L 2/00; F21V 21/0965; F21V 21/406; F21V 23/003
See application file for complete search history.

(56) References Cited

U.S. PATENT DOCUMENTS

| | | | |
|---|---|---|---|
| D448,873 | S | 10/2001 | Dalton et al. |
| D545,468 | S | 6/2007 | Mak |
| D565,766 | S | 4/2008 | Shiu |
| D581,076 | S | 11/2008 | Brown et al. |
| D622,879 | S | 8/2010 | Kotsis et al. |
| D650,105 | S | 12/2011 | Crawford et al. |
| D661,009 | S | 5/2012 | Bennett et al. |
| D663,471 | S | 7/2012 | Bennett et al. |
| D677,412 | S | 3/2013 | Smith |
| D693,499 | S | 11/2013 | Bennett et al. |
| D705,467 | S | 5/2014 | Aglassinger |
| D744,680 | S | 12/2015 | Ma |
| D763,494 | S | 8/2016 | Ma |

(Continued)

OTHER PUBLICATIONS

Home Depot, "Energizer Weather Ready LED Folding Lantern", *YouTube*, *https://www.youtube.com/watch?v=7p0nG_moOlk*, Feb. 10, 2012, 6 pages, accessed on Aug. 4, 2020.

(Continued)

*Primary Examiner* — Thomas M Sember
(74) *Attorney, Agent, or Firm* — Alston & Bird LLP

(57) ABSTRACT

Lighting systems and connectable lighting devices enable size adjustment to an area illuminated by the lighting system. The connectable lighting system may include a plurality of lighting devices. A lighting device of the plurality of lighting devices may include a body defining a lighting side, a first sidewall positioned on a first side of the lighting side, and a second sidewall positioned on an opposite second side of the lighting side; at least one light emitting component configured to emit light through at least a portion of the lighting side; a first set of metal contacts at least partially embedded within the first sidewall of the body; and a second set of metal contacts at least partially embedded within the second sidewall of the body; and wherein at least one of: the first set of metal contacts are magnets or the second set of metal contacts are magnets.

15 Claims, 9 Drawing Sheets

(56) References Cited

U.S. PATENT DOCUMENTS

| | | | | |
|---|---|---|---|---|
| D770,070 | S | 10/2016 | Zhou et al. | |
| D773,704 | S | 12/2016 | Pardo et al. | |
| D783,872 | S | 4/2017 | Aksnes | |
| D809,207 | S | 1/2018 | Hussain | |
| D809,690 | S | 2/2018 | Marshall | |
| 9,976,724 | B2 | 5/2018 | Bennett et al. | |
| D823,507 | S | 7/2018 | Pontano et al. | |
| D844,203 | S | 3/2019 | Ma | |
| D844,872 | S | 4/2019 | Plott | |
| D844,875 | S | 4/2019 | Jeon | |
| D850,683 | S | 6/2019 | Shelton | |
| D857,959 | S | 8/2019 | Yu | |
| D918,452 | S | 5/2021 | Ng et al. | |
| D935,078 | S | 11/2021 | Chan et al. | |
| 2013/0163234 | A1* | 6/2013 | Hsien | F21V 21/005 362/249.02 |
| 2022/0264726 | A1* | 8/2022 | Cutt | H05B 47/19 |

OTHER PUBLICATIONS

Energizer, “FL450”, Product Datasheet, retrieved from https://dtsheet.com/doc/1430252/f1450-f1450—energizer-technical-information on Aug. 4, 2020.

Energizer, “Energizer Weatherready Emergency Area Light”, retrieved from https://www.energizer.com/flashlights-lighting/energizer-emergency-area-light on Aug. 13, 2020.

* cited by examiner

LIGHTING SYSTEMS COMPRISING CONNECTABLE LIGHTING DEVICES

TECHNICAL FIELD

The present disclosure relates generally to lighting systems encompassing individually operable lighting devices configured for connection relative to one another. For example, lighting devices, such as panel lighting devices may be connected and disconnected from other panel lighting devices to increase or decrease the size of an illuminated area.

BACKGROUND

Lighting devices may comprise panel lights and may be placed in locations to illuminate an area. Lighting devices including panel lights are configured to emit light over a wide area. This allows users to have both hands free while still illuminating the work area.

However, lighting devices including panel lights provide light to a fixed-size work area. Where a user requires light to be provided to a wider area, the user may need to reposition the lighting device as the user moves about the work area.

Therefore, a need exists for lighting devices enabling flexibility in selecting a size of an illumination area. Through applied effort, ingenuity, and innovation, Applicant has solved these aforementioned issues by developing solutions embodied in the present disclosure, which are described in detail below.

BRIEF SUMMARY

According to various embodiments, a lighting device is provided. In some embodiments, the lighting device includes a body defining a lighting side, a first sidewall positioned on a first side of the lighting side, and a second sidewall positioned on an opposite second side of the lighting side; at least one light emitting component configured to emit light through at least a portion of the lighting side; a first set of metal contacts at least partially embedded within the first sidewall of the body; and a second set of metal contacts at least partially embedded within the second sidewall of the body; and wherein at least one of: the first set of metal contacts are embodied as magnets or the second set of metal contacts are embodied as magnets.

In some embodiments, the lighting side, the first sidewall, and the second sidewall are sides of a body shape selected from: triangular, rectangular, or trapezoidal.

In some embodiments, the first set of metal contacts and the second set of metal contacts are magnets having opposite polarities such that the first set of metal contacts are magnetically attracted to a second set of metal contacts of a second lighting device.

In some embodiments, the first set of metal contacts are magnets having a polarity such that the first set of metal contacts are magnetically attracted to a second set of metal contacts of a second lighting device.

In some embodiments, the body further defines a third surface including a foldable handle, wherein the foldable handle is configured to move between a stowed position wherein the foldable handle is parallel to the third surface and a portable position wherein the foldable handle is perpendicular to the third surface.

In some embodiments, the body further defines a fourth surface and an integrated handle, wherein the integrated handle is positioned opposite the lighting side.

In some embodiments, the lighting device further includes a lens disposed on the third surface and a second light source configured to emit light through the lens disposed on the third surface.

According to various embodiments, a connectable lighting system is provided. In some embodiments, the system includes a plurality of lighting devices, a lighting device of the plurality of lighting devices including: a body defining a lighting side, a first sidewall positioned on a first side of the lighting side, and a second sidewall positioned on an opposite second side of the lighting side; at least one light emitting component configured to emit light through at least a portion of the lighting side; a first set of metal contacts at least partially embedded within the first sidewall of the body; and a second set of metal contacts at least partially embedded within the second sidewall of the body. In some embodiments, at least one of: the first set of metal contacts are embodied as magnets or the second set of metal contacts are embodied as magnets. In some embodiments, the first set of metal contacts of the lighting device is configured to operably connect to the second set of metal contacts of a respective other lighting device of the plurality of lighting devices.

In some embodiments, the lighting side, the first sidewall, and the second sidewall of the lighting device are sides of a body shape selected from: triangular, rectangular, or trapezoidal.

In some embodiments, the first set of metal contacts and the second set of metal contacts of the lighting device are magnets having opposite polarities such that the first set of metal contacts are magnetically attracted to a second set of metal contacts of the respective other lighting device.

In some embodiments, the first set of metal contacts are magnets having a polarity such that the first set of metal contacts are magnetically attracted to a second set of metal contacts of the respective other lighting device.

In some embodiments, the first sidewall and the second sidewall of the lighting device define an angle between them, and wherein the angle is such that, in an instance where the plurality of lighting devices is 5 lighting devices, the plurality of lighting devices form a semi-circular shape.

In some embodiments, the body of the lighting device further defines a third surface including a foldable handle, wherein the foldable handle is configured to move between a stowed position wherein the foldable handle is parallel to the third surface and a portable position wherein the foldable handle is perpendicular to the third surface.

In some embodiments, the body of the lighting device further defines a fourth surface and an integrated handle, wherein the integrated handle is positioned opposite the lighting side.

In some embodiments, the lighting device further includes a lens disposed on the third surface and a second light source configured to emit light through the lens disposed on the third surface.

The above summary is provided merely for purposes of summarizing some example aspects to provide a basic understanding of some aspects of the disclosure. Accordingly, it will be appreciated that the above-described aspects are merely examples. It will be appreciated that the scope of the disclosure encompasses many potential aspects in addition to those here summarized, some of which will be further described below.

BRIEF SUMMARY OF THE DRAWINGS

Figure 1:
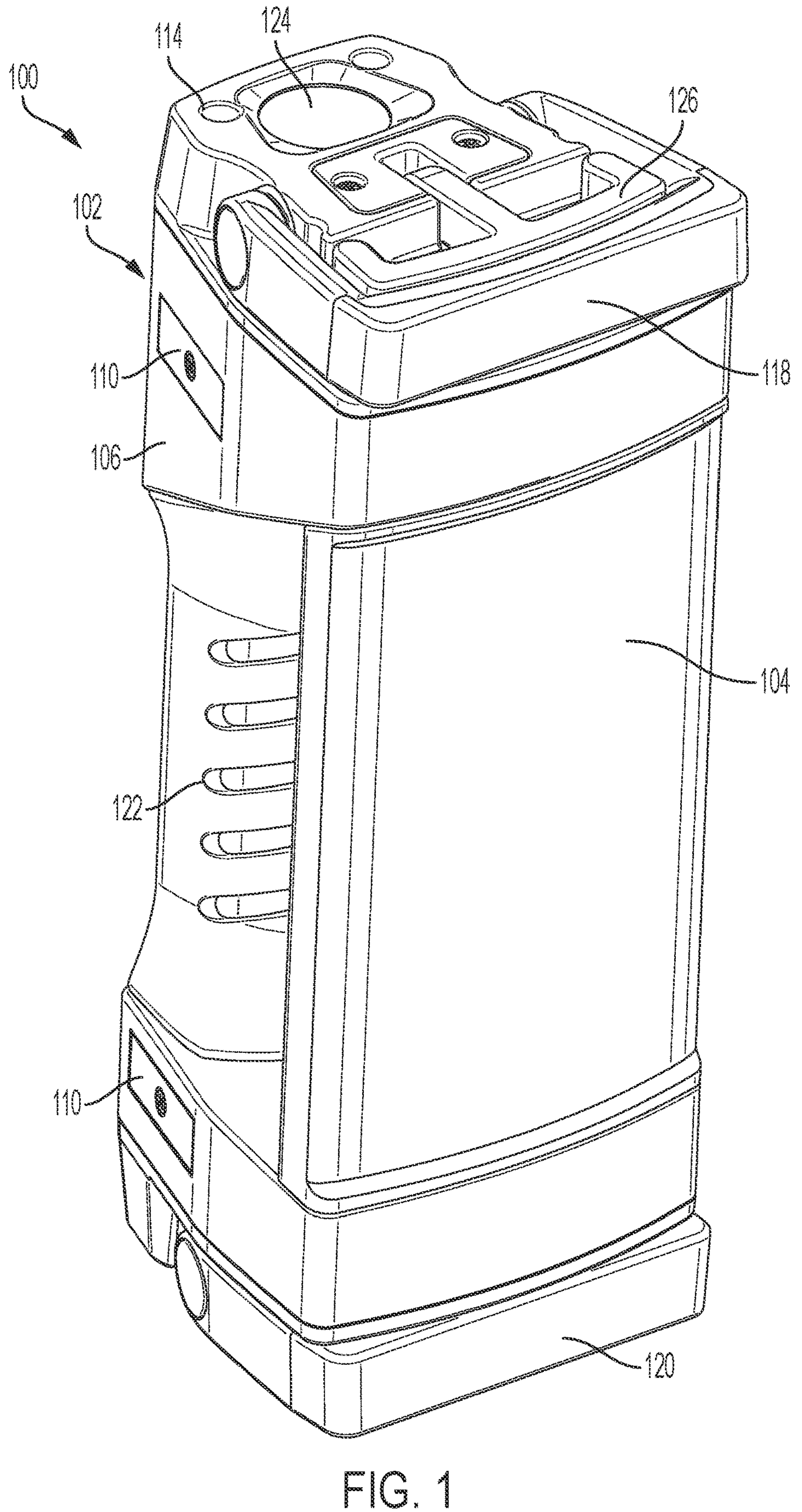
Figure 2:
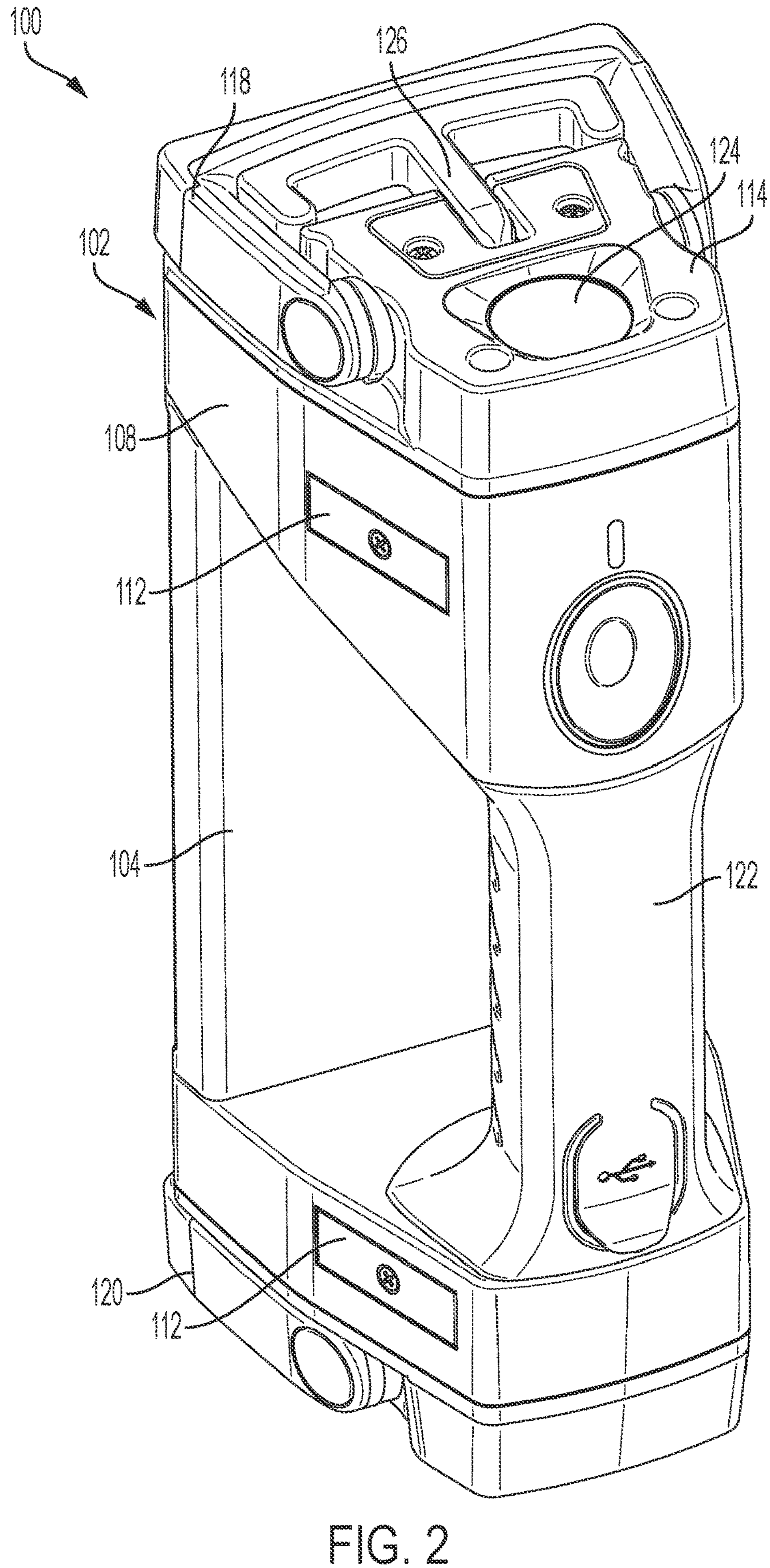
Figure 3:
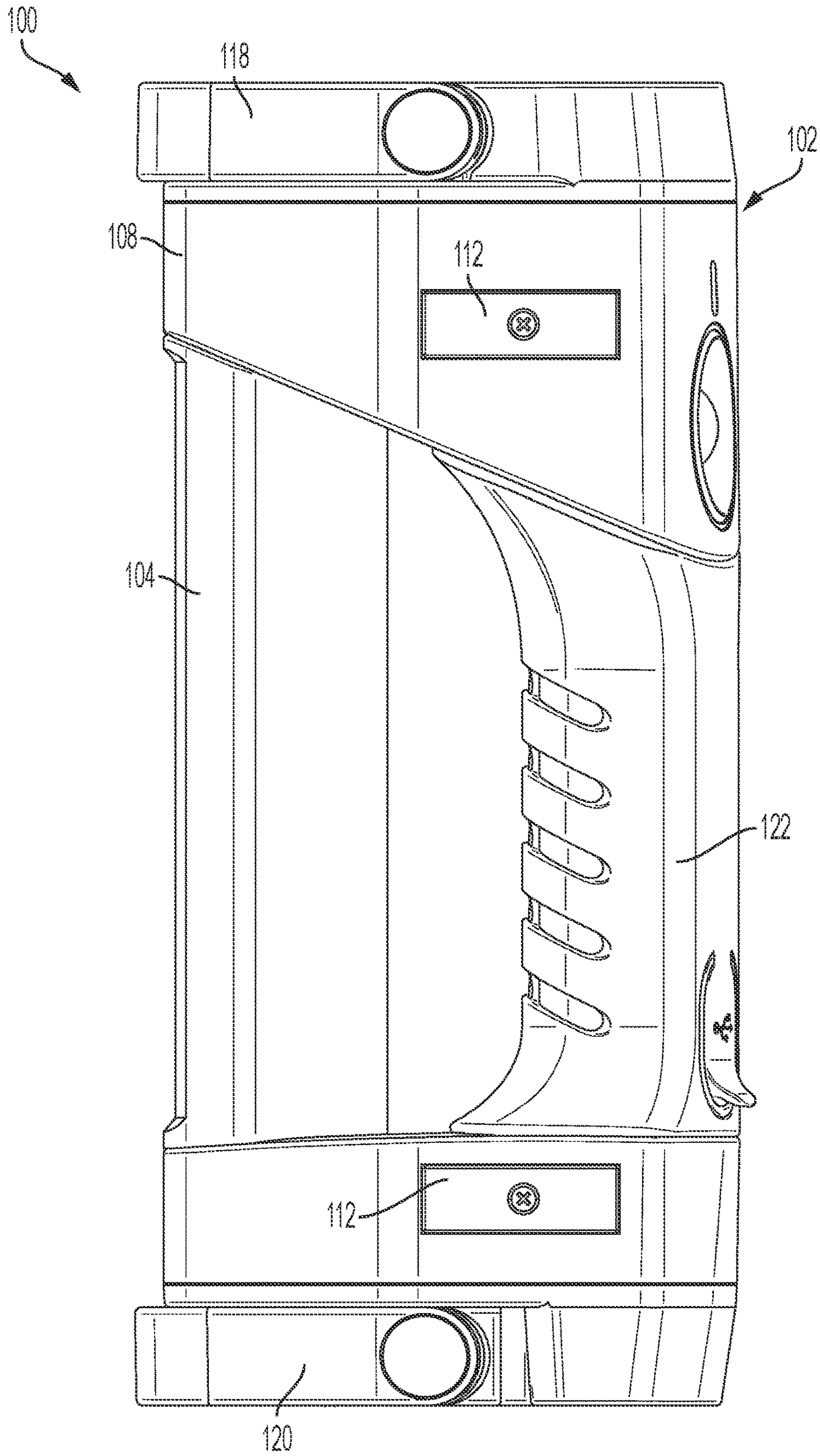
Figure 4:
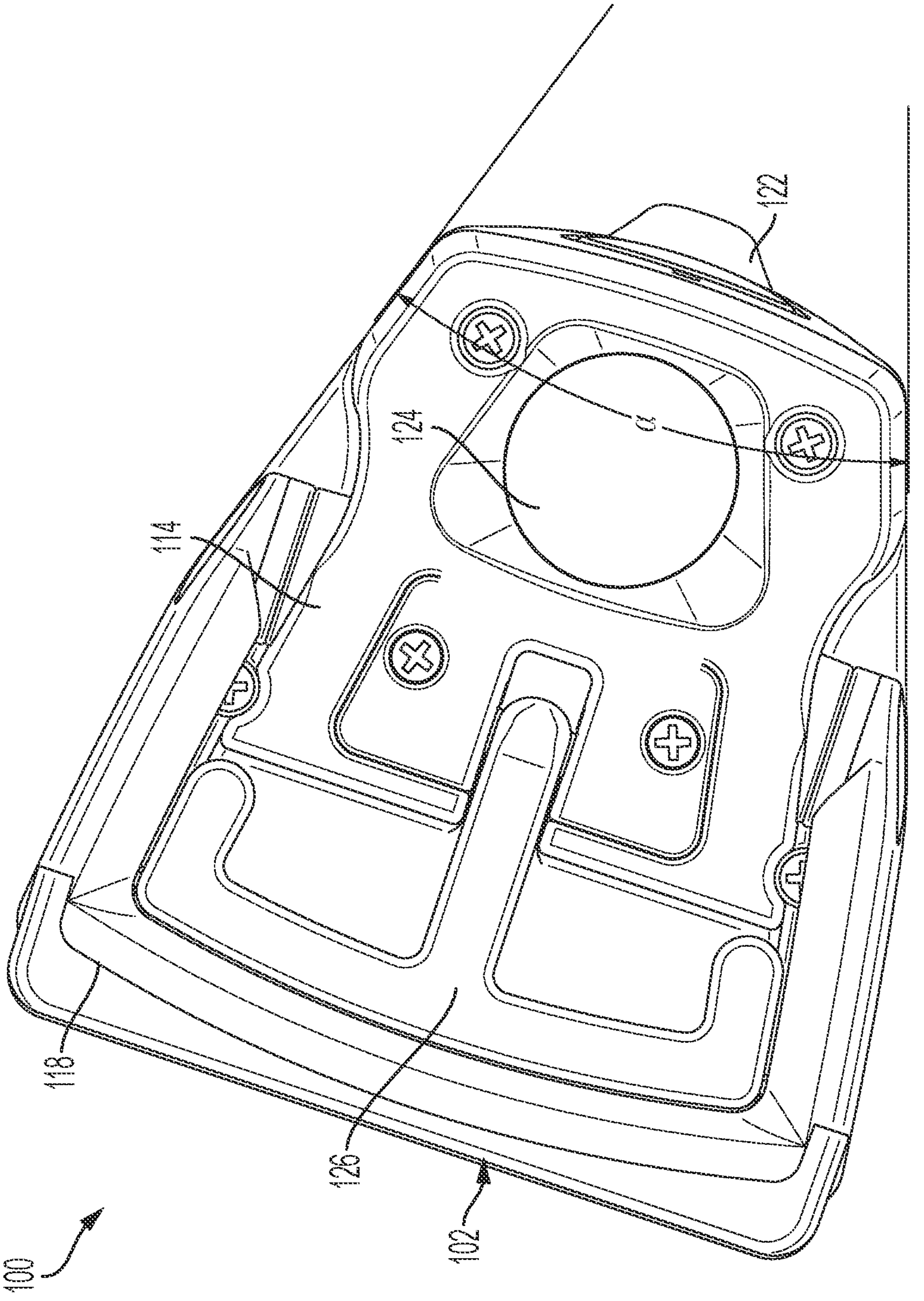
Figure 5:
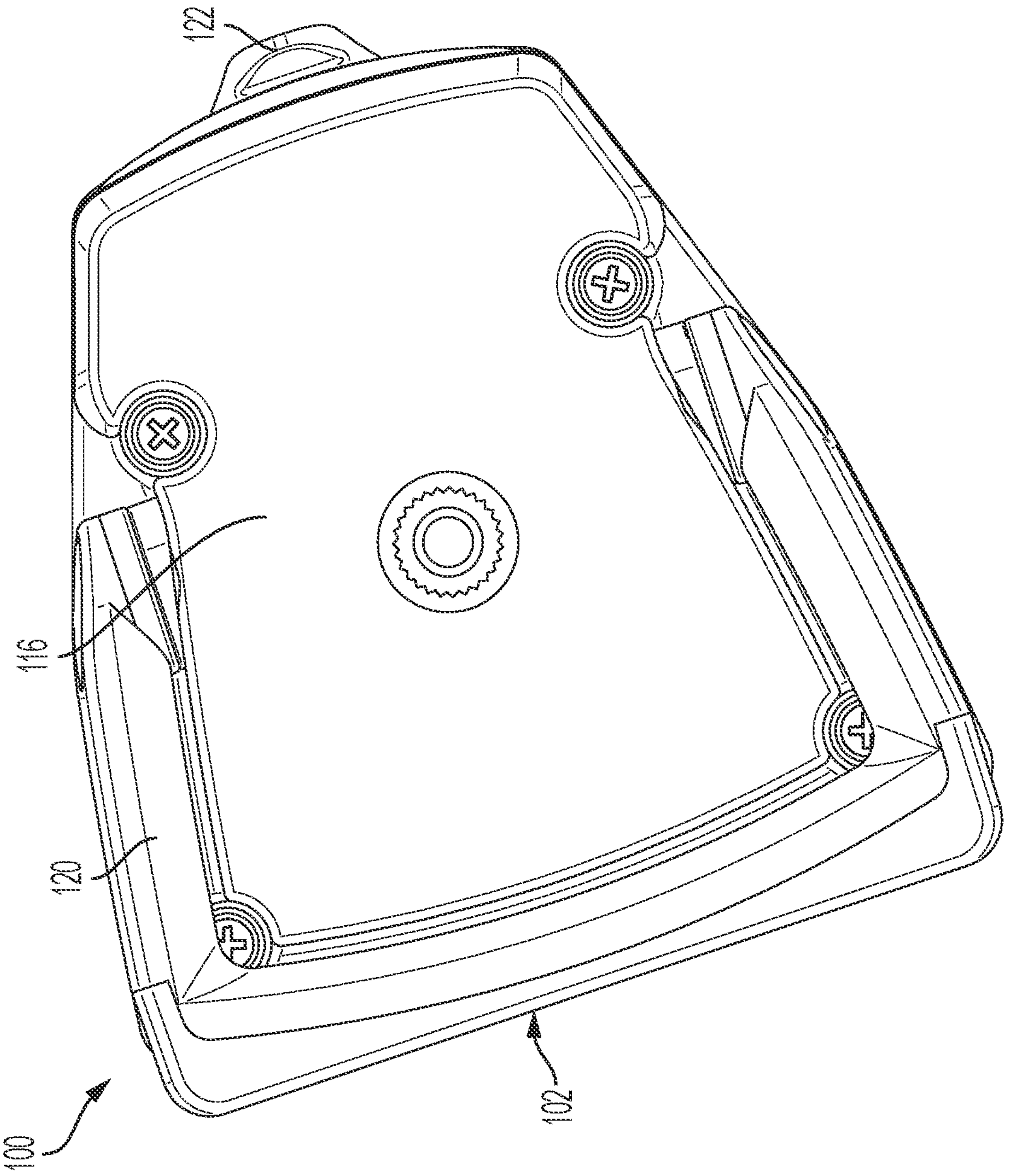
Figure 6:
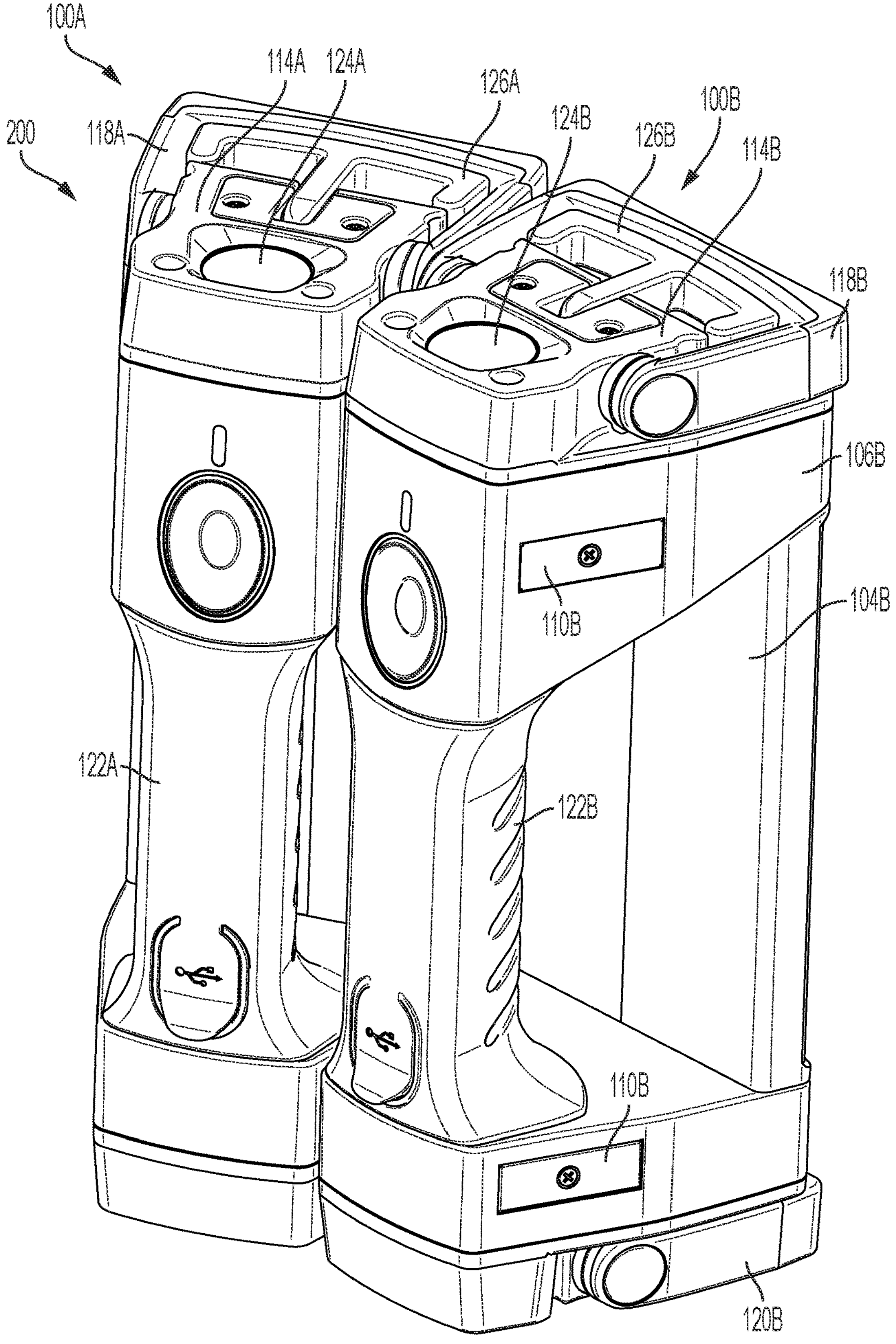
Figure 7:
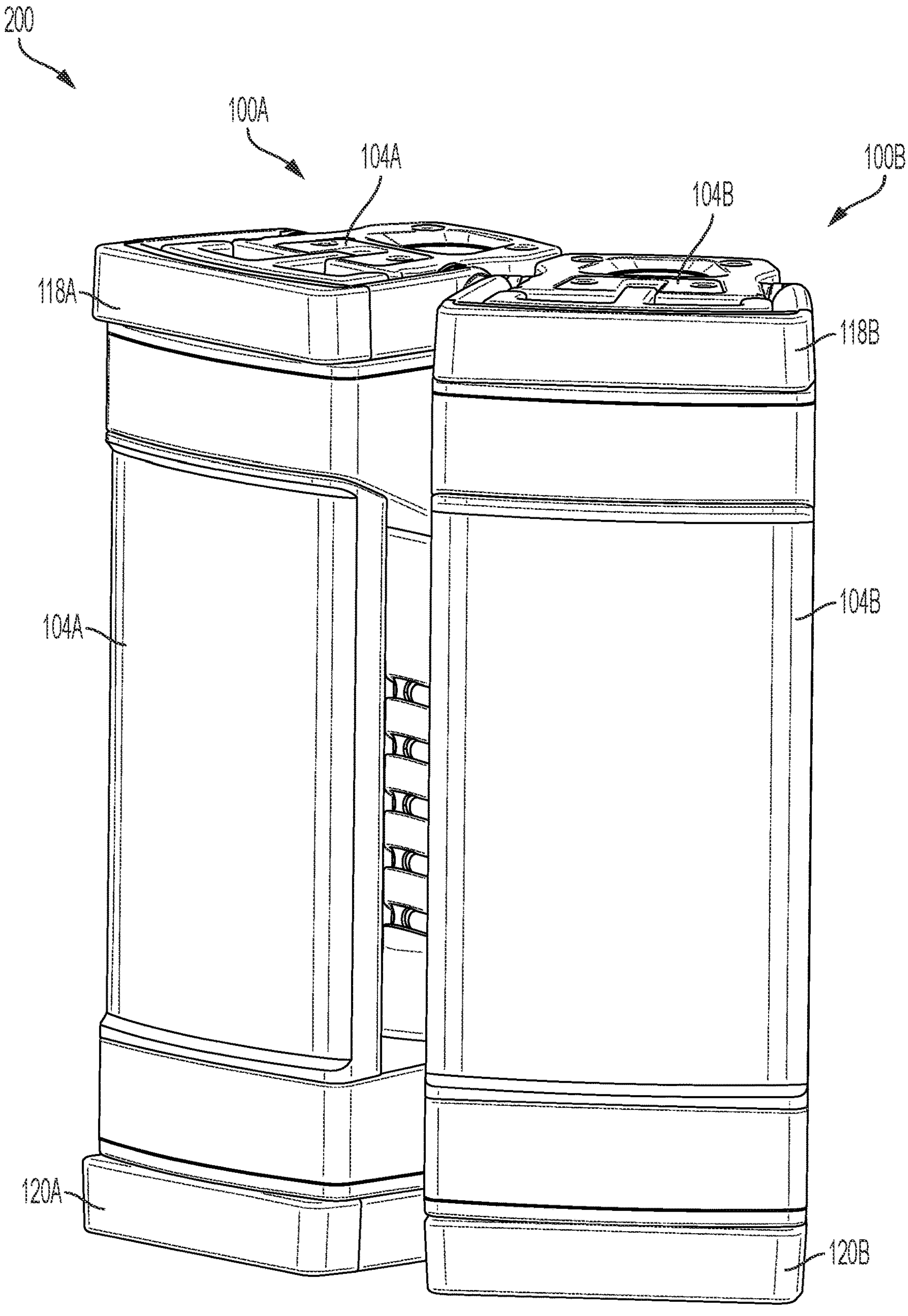
Figure 8:
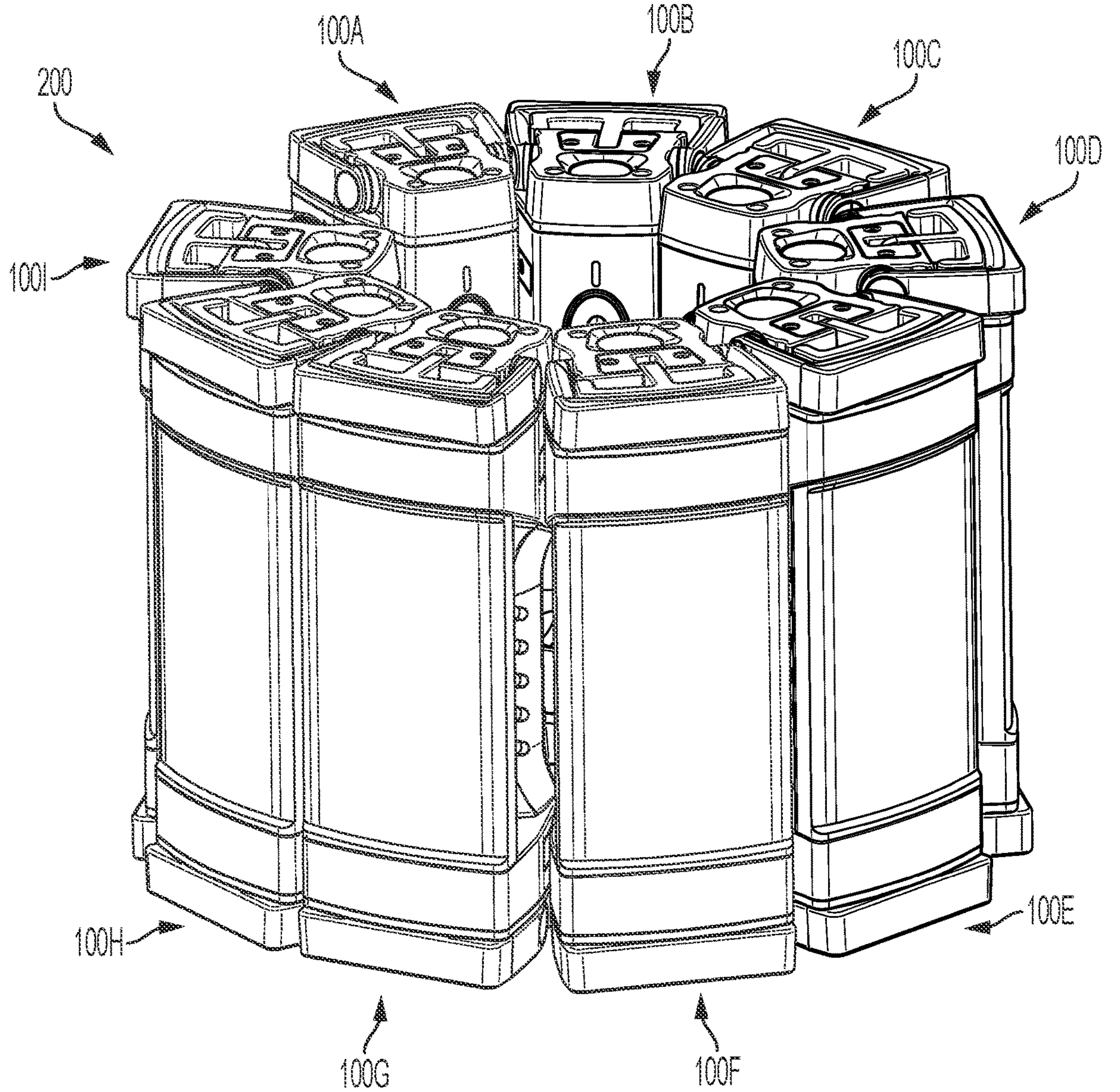
Figure 9:
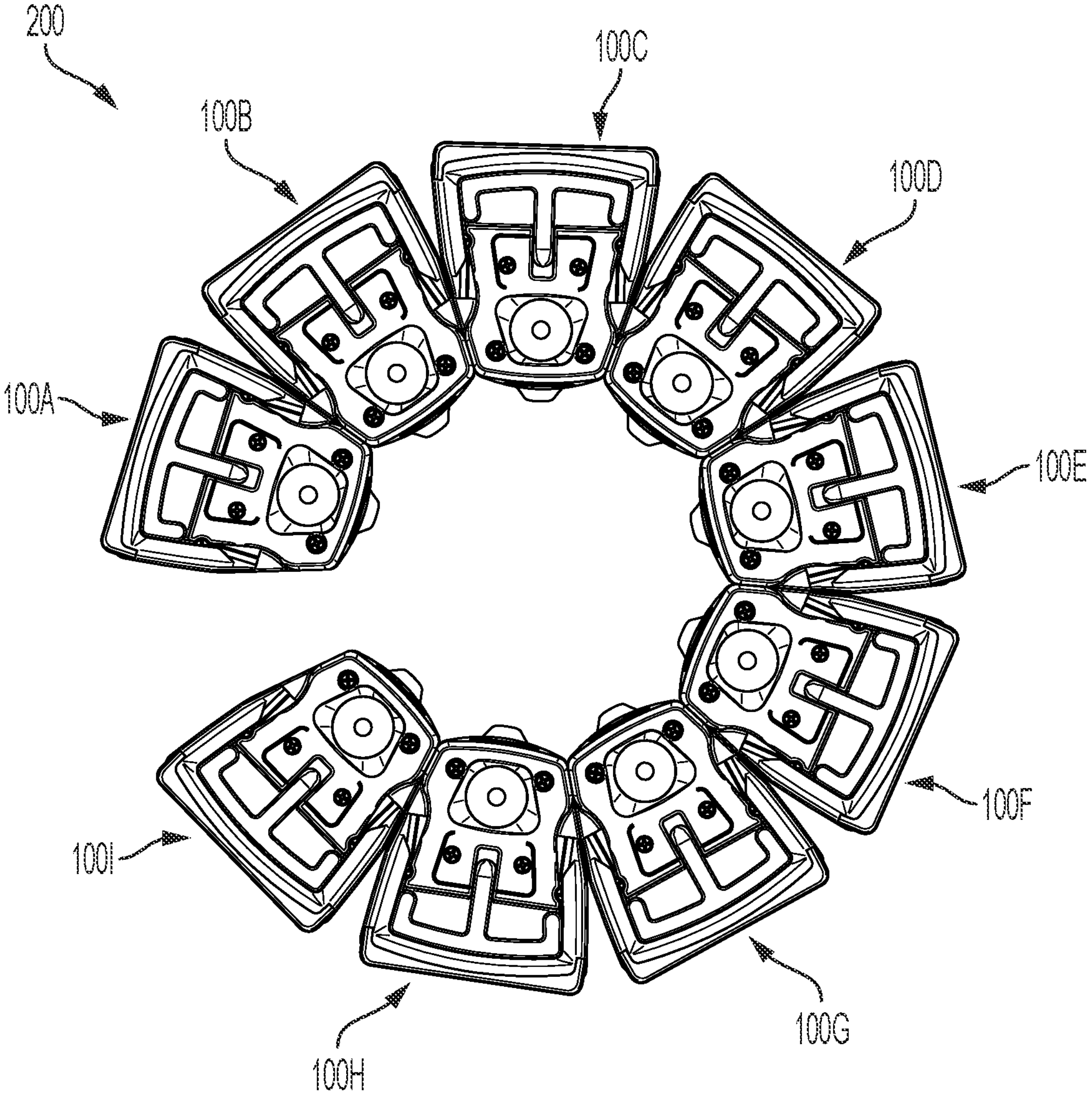

Having thus described the disclosure in general terms, reference will now be made to the accompanying drawings, which are not necessarily drawn to scale, and wherein:

FIG. 1 is a front angled view of an example lighting device in accordance with some embodiments;

FIG. 2 is a rear angled view of an example lighting device in accordance with some embodiments;

FIG. 3 is a side view of an example lighting device in accordance with some embodiments;

FIG. 4 is a top view of an example lighting device in accordance with some embodiments;

FIG. 5 is a bottom view of an example lighting device in accordance with some embodiments;

FIG. 6 is a rear angled view of an example lighting system in accordance with some embodiments;

FIG. 7 is a front angled view of an example lighting system in accordance with some embodiments;

FIG. 8 is a front angled view of an example lighting system in accordance with some embodiments; and FIG. 9 is a top view of an example lighting system in accordance with some embodiments.

DETAILED DESCRIPTION

Various embodiments will now be described more fully hereinafter with reference to the accompanying drawings, in which some, but not all embodiments are shown. Indeed, various embodiments may be embodied in many different forms and should not be construed as limited to the embodiments set forth herein; rather, these embodiments are provided so that this disclosure will satisfy applicable legal requirements. Like numbers refer to like elements throughout. In the following description, various components may be identified as having specific values or parameters, however, these items are provided as exemplary embodiments. Indeed, the exemplary embodiments do not limit the various aspects and concepts of the embodiments as many comparable parameters, sizes, ranges, and/or values may be implemented. The terms "first," "second," and the like, "primary," "exemplary," "secondary," and the like, do not denote any order, quantity, or importance, but rather are used to distinguish one element from another. Further, the terms "a," "an," and "the" do not denote a limitation of quantity, but rather denote the presence of "at least one" of the referenced item.

Each embodiment disclosed herein is contemplated as being applicable to each of the other disclosed embodiments. All combinations and sub-combinations of the various elements described herein are within the scope of the embodiments.

As used herein, "about" in the context of a numerical value or range means within ±10% of the numerical value or range recited or claimed.

The embodiments described below relate to a lighting device and a lighting system comprising a plurality of lighting devices connected to one another. The lighting device has a lighting side encompassing a light emitting component (e.g., a panel light) configured to emit light from at least a portion of the lighting side. First and second sidewalls may be positioned on opposing first and second sides of the lighting side. In some embodiments, the lighting device additionally comprises one or more handles, such as a handle positioned behind the lighting side and between the first and second sidewalls. The lighting device comprises one or more connection component on the first sidewalls and the second sidewall. These connection components are configured to enable connection between multiple lighting devices. As an example, these connection components may be embodied as connection contacts, such as metal contacts embedded within the first and second sidewalls. Certain of the metal contacts may be magnetic (e.g., the metal contacts on the first sidewall may be magnetic and the metal contacts on the second sidewall may be a ferrous metal that is attracted to magnetic material). In some embodiments, connection contacts may comprise magnetic materials on both the first sidewall and the second sidewall (having opposing polarities to enable attraction between the connection contacts on the first sidewall to the connection components on the second sidewall).

The connectable lighting system comprises a plurality of lighting devices that are connected together by the connection components on each of the lighting devices. For example, a connectable lighting system comprises a first lighting device having a first set of magnetic connection contacts (e.g., embedded within the first sidewall) and a second set of ferrous metal connection contacts (e.g., embedded within the second sidewall) and a second lighting device having an identical connection contact configuration. The second lighting device may be connected with the first lighting device by magnetic attraction between the first set of magnetic connection contacts of the first lighting device and the second set of ferrous metal connection contacts of the second lighting device to form a magnetic connection therebetween. Additional lighting devices may be connected through an identical magnetic connections with the first and second lighting device. As discussed in greater detail herein, the lighting devices may define an acute angle between the lighting side and each of the first sidewall and the second sidewall. The acuate angle between the lighting side and each sidewall causes the lighting sides of adjacently connected lighting devices (e.g., a first lighting device connected to a second lighting device) to direct light in different directions. As additional lighting devices are connected, the lighting sides of the connected lighting devices collectively approximate an arcuate shape to expand the width of an area illuminated by the lighting system. In certain embodiments, a plurality of lighting devices may be connected to form a complete circle, such that an area of illumination by the lighting device extends 360° around the lighting system.

The connectable lighting system may be easily disassembled by removing connectable lighting devices. In embodiments utilizing magnetic connections between attached lighting devices, a lighting device (e.g., a second lighting device) may be pulled away from a first lighting device to overcome the attractive force of the magnetic connection. By disassembling the lighting system, the area illuminated by the lighting system may be decreased.

Example Lighting Devices

Referring now to FIGS. 1 and 2, front and rear angled views, respectively, are shown of an example lighting device 100. In some embodiments, the example lighting device 100 may be a work light or a flashlight. In the illustrated embodiments, the lighting device 100 includes a body 102. In some embodiments, the body 102 includes one or more light emitting portions, such as a panel, which may form a lighting side 104 or be integrated into a lighting side 104. The light emission portions may be dispersed throughout the lighting side 104 and configured to emit a diffused light over a wide area and/or the light emission portions may be a narrow-beam lighting component configured to emit a narrow beam of light.

The light emission components may be controllable by an onboard controller and may be powered by an onboard power supply. The light emission components may also be controllable by a remote user device (e.g., a smart phone) that may establish a short or long-range wireless connection with the onboard controller of the lighting device and allow the user to control the lighting device remotely. The controller may have a user interface portion (e.g., a button) for powering the lighting device on/off and/or for switching modes. The power supply may comprise a replaceable battery (e.g., one or more primary electrochemical cells) or a rechargeable battery. In the latter embodiments, the lighting device may have one or more integrated charging ports for charging the lighting device. In some embodiments, the one or more charging ports may additionally be configured to output power, for example, to charge one or more connected external devices (e.g., a connected lighting device).

The body 102 may additionally comprise one or more components for supporting the lighting device—such as one or more handles, hooks, and/or the like. The body 102 may comprise a plastic material. In other embodiments, the body 102 may comprise a metal material. The metal material may be non-ferrous (non-magnetic), such as aluminum. The metal material may be a ferrous metal (magnetic), such as ferrous iron, and in such embodiments, magnetic components as discussed herein are configured to interact with the ferrous nature of the body 102 to enable connection between other, connected lighting devices 100.

In some embodiments, the body 102 may define various sides, including a lighting side 104, a first sidewall 106, and a second sidewall 108. In some embodiments, the first and second sidewalls 106, 108 may be positioned on opposite first and second sides, respectively, of the lighting side 104. In some embodiments, the lighting side 104, the first sidewall 106, and the second sidewall 108 may be sides of a body shape that may be triangular, rectangular, or trapezoidal. The sidewalls need not be planar, such as in the illustrated embodiment, in which the sidewalls define an angle therein. When discussing angles between the lighting side 104 and the first sidewall 106 or second sidewall 108, this disclosure focuses on the angle between the lighting side 104 and the portion of the first sidewall 106 or second sidewall 108 having an embedded connection contact therein. In the illustrated embodiments, the connection contacts (e.g., contact 110) is located in a portion of a sidewall (e.g., first sidewall 106) spaced a distance away from the lighting side (e.g., such that an angled portion within the sidewall 106, 108 is located between the lighting side 104 and the connection contacts). Thus, an angle referenced as being "acute" between the sidewall and the lighting side 104 is referred to as being an acute angle defined by a plane of the lighting side 104 (the plane being defined immediately adjacent an edge of the lighting side, for embodiments having curved lighting sides) and a plane defined by the connection contact.

With specific reference to FIG. 4, the first and second sidewalls 106, 108 may define an angle α between them (as illustrated, the angle α also results in an acute angle between the sidewalls and the lighting side). In some embodiments, the angle may be an acute angle. In some embodiments, the angle α is less than 45°, such as between 15° and 45°. As a specific example, the angle α may be between about 30°-40° (e.g., between 35°-40°). The angle α may be selected based on a desired shape of a lighting system. For example, the angle α may be selected such that connection of a plurality of lighting devices creates an arced lighting system having an at least approximately 180° arc. As another example, the angle α may be selected such that a lighting system can be created having a complete 360° circle of lighting devices. In yet another embodiment as reflected in the figures, the angle α may be selected such that a complete 360° cannot be created, and instead a small gap is left, for example, to enable cords to be freely passed in a central aperture formed between all of the connected lighting devices. Moreover, in some embodiments, the angle α may be selected to provide a desired width of the lighting side. A larger angle α may correspond with a larger size of the lighting side 104, which may be configured to illuminate a larger area by a single lighting device and/or may be configured to emit a greater intensity of light from the lighting side. The angle α between the first and second sidewall may additionally configure each sidewall at a beneficial angle relative to the lighting side such that the lighting device may be placed onto a supporting surface (e.g., a table, floor, and/or the like) to be supported on a sidewall. This may angle the lighting side at a desired angle to emit light for a user.

In some embodiments, the lighting device 100 includes one or more light emitting components (such as light emitting diodes) to illuminate the lighting side 104. In some embodiments, the one or more light emitting components may be embedded within the body 102 of the lighting device 100; that is, the one or more light emitting components may be disposed on the lighting side 104 or within the lighting side 104 and positioned to emit light through at least a portion of the lighting side 104. In some embodiments, the light emitting components may comprise the lighting side 104 of the body 102 and emit light that does not pass through any other structure of the body 102. In some embodiments, the one or more light emitting components may be shaped similarly to the lighting side 104, which may have a variety of shapes, including planar and curved. In some embodiments, the one or more light emitting components may be panel lights that may conform to the shape of the lighting side 104. In some embodiments, the lighting side 104 and/or the light emitting components may be shaped and/or positioned to emit light in an arc. For example, the lighting side 104 may be curved and the light emitting components disposed on or within the lighting side 104 such that the light emitting components emit light in an arc when the lighting device 100 is illuminating an area.

In some embodiments, the lighting device 100 may include one or more sets of connection components to connect a first lighting device to a second lighting device within a lighting system. In the illustrated embodiments, the connection components are embodied as metal contacts. However, it should be understood that the connection components may be embodied as any of a plurality of configurations enabling connection between multiple lighting devices (e.g., hook-and-loop fasteners, interference fit clips, snaps, and/or the like). In the illustrated embodiments, the lighting device 100 includes a first set of metal contacts 110 embedded in a first sidewall and a second set of metal contacts 112 embedded in a second sidewall. The metal contacts may be integrated into the body 102 of the lighting device 100 or fixedly attached (e.g., by one or more fasteners) to an exterior surface of the sidewall (e.g., within a groove formed in the exterior surface of the sidewall such that the contacts remain at least substantially planar with the surface of the sidewall). In other embodiments, the metal contacts may be integrally formed as a part of the sidewall and/or secured to an interior surface of a respective sidewall, such that the sidewall has a uniform appearance. In such embodiments, the sidewall may comprise a material penetrable by magnetic forces, such that magnetic forces between metal contacts of multiple lighting devices are sufficiently strong to enable attachment between the metal contacts.

Moreover, in the illustrated embodiments, the first set of metal contacts 110 comprises one or more metal contacts (e.g., two metal contacts spaced apart from one another, near opposite ends of the body of the lighting device). The second set of metal contacts 112 comprises one or more metal contacts (e.g., two metal contacts). The number of metal contacts of the first set of metal contacts 110 is identical to the number of metal contacts of the second set of metal contacts 112. Moreover, the metal contacts of the first and second set of metal contacts are aligned, such that each metal contact is spaced the same distance from a respective end of the body of the lighting device. By aligning the metal contacts of the first set of metal contacts 110 and the second set of metal contacts 112, connected lighting devices within a lighting system remain aligned relative to one another.

In some embodiments, the first set of metal contacts 110 and/or the second set of metal contacts 112 may be magnets. In some embodiments, the first and second set of metal contacts 110, 112 may be magnets having opposite polarities (i.e., the first set of metal contacts 110 may be positive and the second set of metal contacts 112 may be negative, or vice-versa). In some embodiments, only one set of metal contacts may be magnets and the other set of metal contacts is embodied as a ferrous metal attractable to magnets. For example, the first set of metal contacts 110 may be positive or negative magnets while the second set of metal contacts 112 is a ferrous metal. In some embodiments, the first set of metal contacts 110 may be magnets having a polarity that magnetically attracts the first set of metal contacts 110 to a second set of metal contacts of another lighting device. It should be understood that providing one or more metal contacts as magnets further enables the lighting device to be attached to a metallic surface (e.g., a hood of a car, a side of a refrigerator, and/or the like) to provide additional flexibility for a user in placement of the lighting device.

Referring now to FIGS. 3, 4, and 5, side, top, and bottom views, respectively, are shown of an example lighting device 100. In some embodiments, the body 102 of the lighting device 100 may define a third surface 114 and a fourth surface 116. In the illustrated embodiments, the third and fourth surfaces 114, 116 are ends of the lighting device, such as top and bottom surfaces, respectively, of the lighting device 100. In some embodiments, the third and/or the fourth surface 114, 116 may include a respective foldable handle 118, 120. In some embodiments, the foldable handles 118, 120 may be foldable between a stowed position (as shown in the Figures), where the foldable handles 118, 120 are parallel to the third and fourth surfaces 114, 116, respectively and are stowed within/adjacent to the third and fourth surfaces 114, 116, and in other embodiments the foldable handles 118, 120 may be unfolded into a deployed position, where the foldable handles 118, 120 extend away from the body (e.g., the foldable handles are at least substantially perpendicular to the third and fourth surfaces 114, 116, respectively). In some embodiments, the foldable handles 118, 120 may be used to transport the lighting device 100 from one location to another when in the deployed position and then may be stowed (e.g., by an operator) when the lighting device 100 is in its desired location.

In some embodiments, the body 102 may further define an integrated handle 122. In some embodiments, the integrated handle 122 may be positioned opposite the lighting side 104. In some embodiments, the integrated handle 122 may include grips on at least one surface. In some embodiments, the integrated handle 122 may be removed entirely, which may allow for smaller angles between the first and second sidewalls 106, 108.

In some embodiments, the lighting device 100 may also include a hook 126. In some embodiments, the hook 126 may be disposed on the third surface 114 of the lighting device 100. In some embodiments, the hook 126 may be disposed on the first or second sidewalls 106, 108. In some embodiments, the hook 126 may be positioned adjacent to one of the foldable handles 118, also on the third surface 114. In some embodiments, the hook 126 may be in a folded position where the hook 126 is flush with the third surface 114, while in other embodiments the hook 126 may be in an unfolded position where the hook 126 is not flush with the third surface 114 (e.g., the hook 126 is perpendicular to the third surface 114). In some embodiments, the hook 126 may be used to hang the lighting device 100 in an elevated position, such as from a bar, a beam, a wire, or similar structure.

In some embodiments, the lighting device 100 may include a lens 124. In some embodiments, a second light emitting component may be embedded within the lighting device 100 and configured to emit light through at least a portion of the lens 124. In some embodiments, the lens 124 may be positioned on the third surface 114, or embedded partially within the third surface 114.

Example Lighting Systems

Referring now to FIGS. 6 and 7, rear and front angled views, respectively, of an example connectable lighting system 200 are shown. The connectable lighting system 200 comprises a plurality of lighting devices 100A, 100B, etc., each having a configuration as discussed above with respect to the example lighting device 100. Components of the lighting devices 100A, 100B will be given the same numeral designations as for the previously described lighting device 100, with the appended A, B, etc. to denote an individual lighting device of the larger system 200. For example, lighting side 104 may be described and labeled as 104A for lighting device 100A and as 104B for lighting device 100B.

In some embodiments, the plurality of lighting devices 100A, 100B of the connectable lighting system 200 may be connected by the first and second sets of connection components (e.g., metal contacts 110, 112). For example, in instances where the first and second sets of metal contacts 110, 112 are magnets with opposite polarities, a first lighting device 100A may be connected to a second lighting device 100B by moving the lighting devices into a position where the first set of metal contacts 110A of the first lighting device 100A magnetically attract to and form a magnetic connection with the second set of metal contacts 112B of the second lighting device 100B. In some embodiments, different magnetic polarities can be used to help position the lights relative to one another. For example, when each of the first and second sets of metal contacts 110, 112 are magnets, the magnetic attraction between the contacts (e.g., between the first set of metal contacts for a first lighting device and the second set of metal contacts for a second lighting device) may cause the contacts to automatically align as the technician brings them into proximity with each other; in at least this way, having both first and second sets of metal contacts 110, 112 be magnets may aid in forming the system 200. However, the magnetic attraction of a magnetic first set of metal contacts 110A to a non-magnetic second set of metal contacts 112B may also aid in aligning the metal contacts.

According to various embodiments, the number of lighting devices 100A, B, etc. in the plurality of lighting devices may vary in number depending on the system requirements (i.e., the needs of a technician using the lighting devices 100A, B, etc. and the system 200). For example, referring now to FIGS. 8 and 9, front angled and top views, respectively, of the example connectable lighting system 200 are shown where the system 200 includes nine lighting devices 100A, 100B, 100C, 100D, 100E, 100F, 100G, 100H, and 100I. In some embodiments, the number of lighting devices 100A, B, etc. may be varied such that the system 200 has a variety of shapes. For example, in FIGS. 8 and 9, the system 200 has nine lighting devices 100A-I that nearly form a complete circle. In some embodiments, the system 200 may comprise sufficient lighting devices that the system 200 forms a complete circle (e.g., 10 lighting devices). In other embodiments, the system 200 may have lighting devices that form a line or a semi-circle. In some embodiments, five lighting devices (e.g., 100A-100E), when connected together, at least substantially form a semi-circular system 200. However, in other embodiments, the design of the lighting devices 100A, B, etc. may be such that the angle between the first and second sidewalls 106, 108 of the lighting devices 100 may mean that greater or fewer than five lighting devices are needed to form a semi-circle and similarly that greater or fewer than nine lighting devices are needed to form nearly a complete circle. In some embodiments, the lighting devices may be connected such that there is a gap between each connected device large enough for at least a cord to be passed through. The lighting devices 100A, B, etc. may be designed to either increase or decrease the angle between the first and second sidewalls 106, 108 of a lighting device 100, which may enable the overall system 200 to achieve various shapes. For example, a lighting device 100 designed with a larger angle between the sidewalls 106, 108 may allow a larger surface area for the lighting side 104 and subsequently decrease the number of lighting devices required to form a complete circle for the system 200.

In some embodiments, more lighting devices may be used to create greater illumination area by increasing the number of lighting sides 104A, B, etc. In some embodiments, the design of the shape and/or size of the lighting sides 104A, B, etc. may be varied to achieve greater illumination without increasing the number of lighting devices 100A, B, etc. used in the system 200. For example, the lighting sides may be designed to have a curved surface to increase illumination area, or the lighting sides may be designed with a greater area to achieve a similar result.

In some embodiments, the sets of metal contacts (the first set 110, the second set 112, or both sets) may be configured to conduct one or more signals between connected lighting devices 100A, B, etc. In some embodiments, the one or more signals may be configured to do one or more of: turning the light emitting component on, turning the light emitting component off, changing a mode of operation of the light emitting component (e.g., changing the intensity or changing a flashing frequency), or changing a color of the light emitting component. In some embodiments, the sets of metal contacts 110, 112 may be configured to transmit power between the various lighting devices 100 when they are connected into a system; the metal contacts 110, 112 may be in electrical communication with the onboard controller, which may be configured to transmit control signals only, power only, or both. In at least this way, only one lighting device (e.g., 100A) may need to be plugged into an external power source to distribute power to all connected lighting devices (e.g., 100B, C, etc.). For example, power may flow through the metal contacts 110, 112 to the controller, and ultimately to onboard power supplies to charge one or more lighting devices 100A, B, etc. In some embodiments, this may enable one user interface (e.g., a button on a single lighting device) to control the operation of all of the connected lighting devices. For example, pressing the button may cause the controller to change the operation of a lighting device (e.g., 100A) and to transmit a signal to a connected lighting device (via the metal contacts 110, 112) instructing the connected lighting devices to perform the same. These instructions can be sent in sequence to a plurality of connected lighting devices.

All of the references cited above, as well as all references cited herein, are incorporated herein by reference in their entireties.

While embodiments have been illustrated and described in detail above, such illustration and description are to be considered illustrative or exemplary and not restrictive. It will be understood that changes and modifications may be made by those of ordinary skill within the scope and spirit of the following claims. Embodiments include any combination of features from different embodiments described above and below.

The embodiments are additionally described by way of the following illustrative non-limiting examples that provide a better understanding of the embodiments and of its many advantages. The following examples are included to demonstrate preferred embodiments. It should be appreciated by those of skill in the art that the techniques disclosed in the examples which follow represent techniques used in the embodiments to function well in the practice of the embodiments, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the embodiments.

Many modifications and other aspects of the disclosure set forth herein will come to mind to one skilled in the art to which this disclosure pertains having the benefit of the teachings presented in the foregoing descriptions and the associated drawings. Therefore, it is to be understood that the disclosure is not to be limited to the specific aspects disclosed and that modifications and other aspects are intended to be included within the scope of the appended claims. Although specific terms are employed herein, they are used in a generic and descriptive sense only and not for purposes of limitation.

What is claimed is:

1. A lighting device comprising:

a body defining a curved lighting side, a first sidewall positioned on a first side of the curved lighting side, and a second sidewall positioned on an opposite second side of the curved lighting side;

at least one light emitting component configured to emit light through at least a portion of the curved lighting side;

a first set of metal contacts at least partially embedded within the first sidewall of the body; and a second set of metal contacts at least partially embedded within the second sidewall of the body;

wherein at least one of: the first set of metal contacts are embodied as magnets or the second set of metal contacts are embodied as magnets, and wherein the first sidewall and the second sidewall of the lighting device define an acute angle between them.

2. The lighting device of claim 1, wherein the curved lighting side, the first sidewall, and the second sidewall are sides of a body shape selected from: triangular, rectangular, or trapezoidal.

3. The lighting device of claim 1, wherein the first set of metal contacts and the second set of metal contacts are magnets having opposite polarities such that the first set of metal contacts are magnetically attracted to a second set of metal contacts of a second lighting device.

4. The lighting device of claim 1, wherein the first set of metal contacts are magnets having a polarity such that the first set of metal contacts are magnetically attracted to a second set of metal contacts of a second lighting device.

5. The lighting device of claim 1, wherein the body further defines a third surface comprising a foldable handle, wherein the foldable handle is configured to move between a stowed position wherein the foldable handle is parallel to the third surface and a portable position wherein the foldable handle is perpendicular to the third surface.

6. The lighting device of claim 5, wherein the body further defines a fourth surface and an integrated handle, wherein the integrated handle is positioned opposite the curved lighting side.

7. The lighting device of claim 6, wherein the lighting device further comprises a lens disposed on the third surface and a second light source configured to emit light through the lens disposed on the third surface.

8. A connectable lighting system comprising:

a plurality of lighting devices, a lighting device of the plurality of lighting devices comprising:

a body defining a lighting side, a first sidewall positioned on a first side of the lighting side, and a second sidewall positioned on an opposite second side of the lighting side;

at least one light emitting component configured to emit light through at least a portion of the lighting side;

a first set of metal contacts at least partially embedded within the first sidewall of the body; and a second set of metal contacts at least partially embedded within the second sidewall of the body;

wherein at least one of: the first set of metal contacts are embodied as magnets or the second set of metal contacts are embodied as magnets, wherein the first set of metal contacts of the lighting device is configured to operably connect to the second set of metal contacts of a respective other lighting device of the plurality of lighting devices, wherein the first sidewall and the second sidewall of the lighting device define an acute angle between them.

9. The connectable lighting system of claim 8, wherein the lighting side, the first sidewall, and the second sidewall of the lighting device are sides of a body shape selected from: triangular, rectangular, or trapezoidal.

10. The connectable lighting system of claim 8, wherein the first set of metal contacts and the second set of metal contacts of the lighting device are magnets having opposite polarities such that the first set of metal contacts are magnetically attracted to a second set of metal contacts of the respective other lighting device.

11. The connectable lighting system of claim 8, wherein the first set of metal contacts are magnets having a polarity such that the first set of metal contacts are magnetically attracted to a second set of metal contacts of the respective other lighting device.

12. The connectable lighting system of claim 8, wherein the acute angle is such that, in an instance where the plurality of lighting devices are connected using at least the first set of metal contacts of the lighting device of the plurality of lighting devices, the plurality of lighting devices form a semi-circular shape.

13. The connectable lighting system of claim 8, wherein the body of the lighting device further defines a third surface comprising a foldable handle, wherein the foldable handle is configured to move between a stowed position wherein the foldable handle is parallel to the third surface and a portable position wherein the foldable handle is perpendicular to the third surface.

14. The connectable lighting system of claim 13, wherein the body of the lighting device further defines a fourth surface and an integrated handle, wherein the integrated handle is positioned opposite the lighting side.

15. The connectable lighting system of claim 14, wherein the lighting device further comprises a lens disposed on the third surface and a second light source configured to emit light through the lens disposed on the third surface.

* * * * *